J. O. FOWLER.
KEY BASE FOR PLASTIC MATERIAL.
APPLICATION FILED MAY 8, 1922.
Reissued July 11, 1922. 15,406.
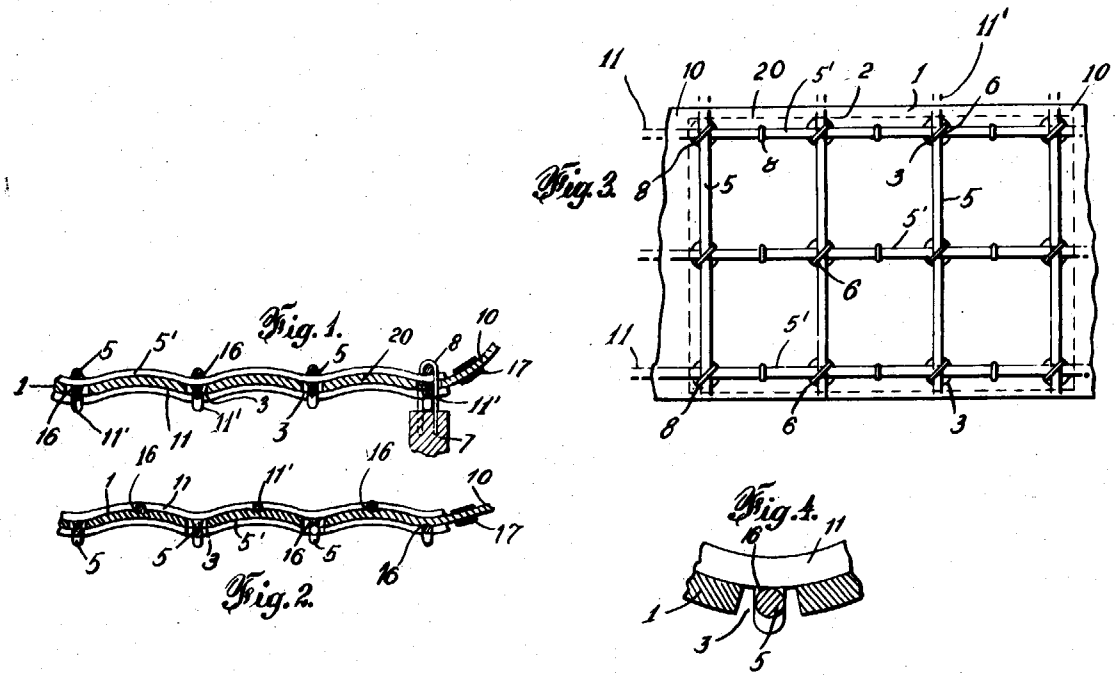
INVENTOR
J. O. Fowler.

UNITED STATES PATENT OFFICE.

JONATHAN O. FOWLER, OF NEW YORK, N. Y.

KEY BASE FOR PLASTIC MATERIAL.

15,406. Specification of Reissued Letters Patent. Reissued July 11, 1922.

Original No. 1,390,774, dated September 13, 1921, Serial No. 255,197, filed September 21, 1918. Application for reissue filed May 8, 1922. Serial No. 559,432.

*To all whom it may concern:*

Be it known that I, JONATHAN O. FOWLER, a citizen of the United States, residing at New York, in the county and State of New York, have invented a certain new and useful Key Base for Plastic Material, of which the following is a specification, the same being a full, clear, and exact description of the invention, such as will enable others skilled in the art to which it appertains to make and use the same.

This invention relates to wall structures and comprises a device having a foundation of fabric and a superposed reinforcing and plaster retaining metal material such as a woven wire work or metal strands.

The primary object of the invention is to provide a covering or key-base to be used for walls of buildings to which cement, concrete or other plastic material may be directly applied in a very thin coating and positively held in a rigid and durable manner.

With this object in view, the invention consists in the use of a fabric or other foundation material, as a suitable felting, which is preferably rendered waterproof by any approved means as by the impregnation or coating thereof with tar—by which term bituminous or like substances or equivalent products for the purpose are also referred to herein—so that there will be no swelling or warping of the base by reason of the dampness of the applied coating of plastic material, and whereby any looseness of, or hollow spaces in, the plaster coat is avoided, as the mortar, when pressed against the uneven face—as any bulges or depressions—of the flexible foundation sheet, will adhere to the same and also be securely held by the adjacent wires embedded in the plastic material.

I have found tarred felt to be superior for the purpose desired to tarred paper or other sheet material hitherto used, as the strong matted fibres of the felt resist great strain on account of their inherent toughness and flexibility, and being a non-conductor of heat the sheet will not become charred or broken, or torn or carried away by the application of water—as at a fire—as occurs with the employment of other tarred products. The tarred felt, furthermore, besides affording a warm sheathing is somewhat yieldable and adheres to the plaster coat and not only serves as a stop to retain the same but also provides a more efficient moisture-proof backing for the mortar than has yet been used.

In addition to other advantageous uses of felt, I have discovered a new property or action thereof, namely that cementitious or plastic materials strongly adhere to a tarred felt surface and also resist deterioration and protect the felt therefrom.

By my invention of the tarred felt foundation sheet I have secured a novel and highly efficient result—which has been hitherto unattainable—the said product being, in the use thereof, also of great utility besides being very economical in cost.

The preferably felt fabric may be also suitably treated with a fire-proofing medium, which treatment may as well serve to impart greater rigidity to the structure.

I preferably construct the fabric with spaced perforations through the same in order to provide keys for holding the plaster coating and anchoring it at intervals to the said key-base.

The wire structure is preferably placed on each face of the foundation so that the strands thereof will cross each other at the said perforations at which points the wires on one face of the foundation will be soldered or welded to the wires on the other face—which operation of making fused joints may be that of either soldering or welding—the said fused joints also serving to reinforce the structure and to afford additional plaster holding means.

By reason of the oppositely disposed strands being drawn toward each other for welding the same together at the said perforations, the portions of the key-base adjacent to the perforations will be thinner than at the other parts thereof.

By the use of my key-base waste of plaster is avoided and a permanent and reliable holding means therefor is secured.

With these and other objects and advantages in view, the invention comprises the construction, arrangement and operation of the several parts which are hereinafter set forth, and also illustrated in the drawings accompanying and forming a part of this specification, and in which:

Figure 1 represents a sectional view of a structure in which the invention is embodied;

Figure 2 is a similar view of a structure in which the arrangement of some of the wires is changed;

Figure 3 is a plan view of one of the blocks or sections formed by a spaced group of wires mounted on an interior fabric base; and Figure 4 illustrates one of the welded joints.

Referring more in detail to the drawings, in which a simple form of this invention is shown, the numeral 1 denotes the base or foundation sheet of flexible fabric, as felt, preferably having a coat of tar 17 on which fabric is mounted at intervals groups of wires comprising a series of preferably parallel horizontal plaster-holding strands 5 positioned along one and usually the front face of the base 1 and serving in connection with the latter to form means for holding the plastic material, and another series of vertical structure-reinforcing strands 11 located at the other face of the base and running preferably parallel and at an angle to the wires 5. Said base or foundation 1 and said groups of wires constitute blocks or sections 20. Between the various spaced blocks or sections 20 is an extension and connecting portion of the foundation 1 thereof which I designate as 10. Those parts of the base forming a part of the blocks 20 are preferably made with spaced perforations 3 at which perforations the wires 5 and 11 cross each other—the said perforations thereby coinciding with the said crossings—and are welded together as at 16, whereby the blocks 20 are thinner at the perforations 3 than at other parts of the same, the wires being respectively bent so as to lie nearer the plane of the foundation at the perforations than at other parts thereof. By reason of the blocks or sections 20 being relatively thicker than the intermediate connecting base 10 the said blocks may be folded on each other so as to be stacked or else they may be cut apart at the connecting base and used separately.

One of each pair of crossed wires, as the strands 5, is bent adjacent to a perforation where it is bridged over the other one, as the strands 11, and the foundation sheet is also bent somewhat at the said crossings, while the wires and perforations are of such relative size that the latter are almost filled by the crossing wires, sufficient free space, however, being left at those points to allow the two sets of wires at the crossing of the same and the perforations to constitute, with the latter, means whereby plaster keys are formed at the said perforations extending to the rear face of the foundation. The horizontal plaster-holding wires 5 on the front face of a section are preferably greater in number than the vertical structure-reinforcing wires 11 of the rear face thereof. The said horizontal wires also preferably have more fused joints than have the other and vertical ones on the other face of the base.

In order to provide additional plaster-holding means I sometimes use supplemental wires 5′ preferably positioned in parallel relation and having parts running at an angle to and preferably crossing the wires 5 on one face of the fabric and positioned between the latter and the said wires 5. I may also employ other additional and supplemental plaster-holding wires 11′ also preferably positioned in parallel relation and preferably crossing the wires 11 on the other face of the fabric. The said supplemental wires 5′ or 11′ are preferably respectively located adjacent to one of the sets of wires 5 or 11 and between the same and the base, the said supplemental wires preferably having parts so positioned as to run in an angular relation in respect to the spaced set of wires 5 or 11 to which they may be attached at suitable places by welding if desired.

Fastening means, as staples 8 or loops 6 may be used to attach the structure to a support, as 7.

I wish it to be understood that I do not desire to be limited to the particular use or the exact details of construction shown and described, for obvious modifications will occur to persons skilled in the art.

What I claim as my invention is:—

1. In a device of the class described, a base comprising a sheet of felt having a group of spaced wires disposed in parallel relation on one face thereof and a second group of spaced parallel wires on the opposite face of said sheet, but running in a different direction from those of the first named group, there being spaced perforations in said sheet at points coinciding with the crossing of the wires of the two groups, and fused joints uniting the crossing wires at said perforations to form means to hold a plaster coat.

2. In a device of the class described, a base comprising a foundation tarred sheet having a set of spaced wires disposed in parallel relation on one face thereof and another set of spaced parallel wires on the opposite face of said sheet, but running in a different direction from those first named, there being spaced perforations in said sheet at points coinciding with the crossing of the wires of the said two sets, and fused joints uniting the crossing wires at said perforations, in combination with additional supplemental wires attached to the said structure and adapted to engage a plaster coat.

3. In a device of the class described, a base comprising a foundation sheet of tarred felt having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing wires at each of said perforations, the said fused joints being so arranged at and with the perforations as to constitute means for supporting plaster keys.

4. In a device of the class described, a base comprising a foundation sheet of tarred felt having a set of spaced parallel wires on one face thereof and another set of spaced parallel wires on the opposite face of said sheet, but running in a different direction from those first named, there being spaced perforations in said sheet at points coinciding with the crossing of the wires of the two sets, and fused joints uniting the crossing wires at said perforations to form means to hold a plaster coat.

5. In a device of the class described, a base comprising a foundation sheet having a set of spaced horizontal wires on one face thereof and another set of spaced wires on the opposite face of said sheet, but running in a different direction from those first named, there being spaced perforations in said sheet at points coinciding with the crossing of the wires of the said two sets: and fused joints uniting the crossing wires at said perforations in combination with additional supplemental wires interposed between the horizontal wires and the sheet and adapted to engage a plaster coat.

6. In a device of the class described, a base comprising a tarred sheet of felt having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing of the wires at said perforations by welding to form means to hold a plaster coat.

7. In a device of the class described, a base comprising a foundation sheet having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing wires at said perforations, in combination with additional supplemental wires lying between the foundaton sheet and the plane of one of the sets of spaced wires and adapted to engage a plaster coat.

8. In a device of the class described, a base comprising a foundation sheet of tarred felt having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing wires at said perforations in combination with additional supplemental wires interposed between the foundation sheet and one of the sets of spaced wires and adapted in connection with the said sheet to engage a plaster coat.

9. In a device of the class described, a base comprising a foundation sheet of tarred felt having an uneven face and having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing wires at said perforations, whereby, when applied to the uneven face of the sheet, mortar will adhere to the same and also be held by the adjacent wires embedded in the plastic material.

10. In a device of the class described, a base comprising a foundation sheet of tarred felt having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing of the wires at said perforations, one of each pair of crossed wires being bent at the said crossings, to form means to engage a plaster coat.

11. In a device of the class described, a base comprising a foundation sheet of tarred felt having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing of the wires at said perforations, the foundation sheet being bent at the said crossings, to form means to hold a plaster coat.

12. In a device of the class described, a base comprising a foundation sheet having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing wires at said perforations, to form means to hold a plaster coat.

13. In a device of the class described, a base comprising a foundation sheet of tarred felt having a set of spaced horizontal plaster-holding means on the front face thereof and another set of spaced vertical structure-reinforcing wires fewer in number on the rear face of said sheet, there being spaced perforations in said sheet at points coinciding with the crossing of the wires of the said two sets, and fused joints uniting the crossing wires at said perforations to form means to hold a plaster coat.

14. In a device of the class described, a base comprising a foundation sheet of tarred felt having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing of the wires at said perforations, one of each pair of crossed wires being bent at said crossings, in combination with additional supplemental wires lying between the foundation sheet and the set of bent wires to engage a plaster coat.

15. In a device of the class described, a section consisting of a base comprising a foundation sheet of tarred felt having a set of spaced horizontal wires on one face thereof and another set of spaced vertical wires on the opposite face of said sheet, there being spaced perforations in said sheet at points coinciding with the crossing of the wires of the said two sets, and fused joints uniting the crossing wires at said perforations, the horizontal wires on one face of the section being greater in number than the vertical wires on the other face thereof, to form means to engage a plaster coat.

16. In a device of the class described, a section consisting of a base comprising a foundation sheet of tarred felt having a set of spaced horizontal wires on one face thereof and another set of spaced vertical wires on the opposite face of said sheet, there being spaced perforations in said sheet at points coinciding with the crossing of the wires of the said two sets, and fused joints uniting the crossing wires at said perforations, each of the horizontal wires on one face of the section having more fused joints than have each of the other and vertical ones on the other face, to form means to engage a plaster coat.

17. In a device of the class described, a base comprising a foundation sheet having a set of spaced wires on one face thereof and another set of spaced wires on the opposite face of said sheet, but running in a different direction from those first named, there being spaced perforations in said sheet at points coinciding with the crossing of the wires of the said two sets, and fused joints uniting the crossing wires at said perforations, in combination with additional supplemental wires lying between the foundation sheet and one of the sets of spaced wires and welded to the latter and adapted to engage a plaster coat.

JONATHAN O. FOWLER.